United States Patent Office 3,238,099
Patented Mar. 1, 1966

3,238,099
SULFANILAMIDES
Markus Zimmermann, Riehen, near Basel, Switzerland,
assignor to Geigy Chemical Corporation, Ardsley,
N.Y., a corporation of Delaware
No Drawing. Filed Dec. 26, 1962, Ser. No. 247,297
Claims priority, application Switzerland, Dec. 29, 1961,
15,121/61, 15,122/61
3 Claims. (Cl. 167—51.5)

The present invention concerns new sulfanilamide derivatives having valuable chemotherapeutical properties as well as pharmaceutical compositions containnig these derivatives as active ingredients.

It has been found that compounds of the formula

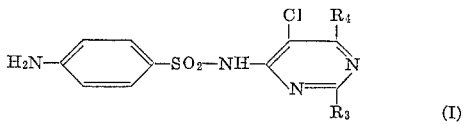

wherein $R_3$ and $R_4$ independently of each other represent chlorine atoms or lower alkoxy radicals, have excellent antibacterial activity. This invention also relates to compositions containing the compounds of Formula I as active ingredients. In the compounds of the Formula I, $R_3$ and $R_4$ preferably represent chlorine atoms or methoxy groups.

The process for the production of these new compounds is characterized by reacting a salt, particularly an alkali metal salt, of a compound of the formula,

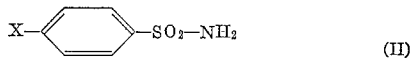

wherein X represents the amino group or a nitrogen-containing group which can be converted into the free amino group, with a pyrimidine derivative of the formula

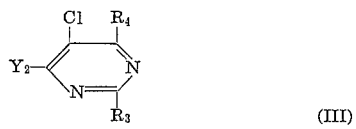

wherein $R_3$ and $R_4$ have the meanings given above, and $Y_2$ represents a halogen atom, in particular a chlorine atom, a lower alkylthio or alkylsulfonyl radical, and if necessary, in any order desired, subjecting the reaction product to hydrolysis or reduction to convert the group X into the free amino group and, if desired, replacing a chlorine atom $R_3$ and/or $R_4$ by a lower alkoxy radical. The reactions are performed, e.g. in a suitable organic solvent, e.g. in dimethyl formamide, acetamide, N,N-dimethyl acetamide or dimethyl sulfoxide while heating.

Again, when a chlorine atom $R_3$ and/or $R_4$ is to be replaced by a lower alkoxy radical, this is done, e.g. by reacting the corresponding compound of Formula I with at least double the equimolar amount of a lower alkali metal alkanolate. Preferably two chlorine atoms $R_3$ and $R_4$ are replaced by two lower alkoxy radicals or, if there is one lower alkoxy radical $R_3$, one chlorine atom $R_4$ is replaced by a lower alkoxy radical.

All starting materials of the Formula III are either known or can be produced from known commercial products by known methods.

Another process for the production of compounds of the Formula I consists in reacting optionally in the presence of an acid binding agent, a reactive functional derivative, particularly the chloride or bromide, of a sulfonic acid of the formula,

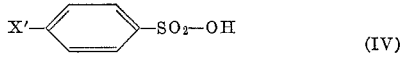

wherein X' represents a nitrogen-containing group which can be converted into the amino group, particularly an acyl-amino or a nitro group, with a substituted aminopyrimidine of the formula

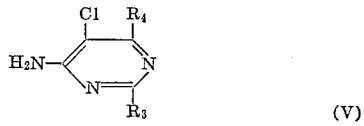

wherein $R_3$ and $R_4$ have the meanings given above and, in any order desired, subjecting the reaction product to hydrolysis or reduction to convert the group X' into the free amino group and, if desired, replacing a chlorine atom $R_3$ and/or $R_4$ by a lower alkoxy radical.

The reaction of reactive functional derivatives of sulfonic acids of the Formula IV with substituted aminopyrimidines of the Formula V is performed, for example, in suitable inert organic solvents such as methylene chloride, acetone, tetrahydrofuran; N,N-diisopropyl-ethylamine, triethylamine, pyridine or collidine, for example, being added as acid binding agent.

When $R_3$ and/or $R_4$ is a lower alkoxy radical, the reaction can also be performed using sodium hydroxide solution as acid binding agent, in a monophase system such as aqueous acetone or in a di-phase system such as water/ether.

The starting aminopyrimidines of the Formula V are obtained, for example, by reacting 2,4,5,6-tetrachloropyrimidine with one mol of ammonia and, if desired, further reacting the resultant 4-amino-2,5,6-trichloropyrimidine with one or two mols of an alkali metal alkanolate.

The new sulfanilamide derivatives corresponding to Formula I are also suitable for the preparation of medicaments for internal or external use, for the treatment of infections caused by gram-positive bacteria such as Staphylococci, Streptococci, Pneumococci as well as by gram-negative bacteria such as *Salmonella typhi*, *Escherichia coli* and *Klebsiella pneumoniae*, and are also distinguished from the known compounds in the art by that, on oral administration, they quickly attain a high blood level and, nevertheless, remain for a long time in the organism and, in addition, that both per se and in the form of their N-acetyl derivatives, they are very easily soluble in a physiological, pH range of 6–8.

For administering, they are combined with suitable carriers to form tablets, dragées (sugar coated tablets), suppositories, syrups or powders; or they can be inserted into capsules in individual dosages, and may also be employed in the form of their pharmaceutically acceptable salts, which salts are the sodium, potassium, lithium, magnesium and calcium salts, as well as the salts with such organic bases as ethylamine, dimethylamine, diethylaminoethanol, ethylenediamine, aminoethanol, diethylamine, diethanolamine or triethanolamine which have a neutral to weakly alkaline reaction and some of which are soluble in water. For example, they may be used as aqueous solutions for injections.

The following non-limitative examples further illustrate the production of the compounds according to the invention. In these examples the temperatures are in degrees centigrade.

*Example 1*

10.9 g. of 2,4,5,6-tetrachloropyrimidine are dissolved in 50 ml. of dimethyl formamide and the solution is added dropwise while stirring to a suspension of 19.4 g. of sulfanilamide sodium salt in 50 ml. of dimethyl formamide at room temperature. The reaction is slightly exothermic. If necessary, the temperature is kept below 30° by occasional cooling. After about 30 minutes, the reaction mixture is concentrated under high vacuum at a maximal bath temperature of 30°. The residue is acidified with a little glacial acetic acid and then stirred into 10% sodium carbonate solution. Undissolved particles are filtered off under suction and the filtrate is extracted once with ether. The pH of the aqueous solution is adjusted to 3 and first an oily and later a crystalline precipitate is obtained which is recrystallized from ethyl acetate. 4-sulfanilamido-2,5,6-trichloropyrimidine is obtained which melts at 210–211° (under decomposition).

*Example 2*

2.4 g. of 4-sulfanilamido-2,5,6-trichloropyrimidine are refluxed for 18 hours with a solution of 1 g. of sodium in 70 ml. of absolute methanol. The solvent is distilled off, the residue is dissolved in water and the pH of the aqueous solution is adjusted to 5 with glacial acetic acid. The precipitate is filtered off and recrystallized from isopropanol, whereupon 4-sulfanilamido-2,6-dimethoxy-5-chloropyrimidine is obtained which melts at 202–203°. In an analogous manner, using 4-sulfanilamido-2-methoxy-5,6-dichloropyrimidine, 4 - sulfanilamido - 2,6 - dimethoxy-5-chloropyrimidine is obtained which, after recrystallization from isopropanol, has a melting point of 202–203°. This compound is thus identical with the product described above.

*Example 3*

2.1 g. of 4,5-dichloro-2,6-dimethoxypyrimidine and 5.8 g. of sulfanilamide sodium salt are stirred for 2 hours at 100° with 6 g. of acetamide. The reaction mixture is then allowed to cool, mixed with a little water and acidified with 2 N-hydrochloric acid. The precipitate is filtered off under suction and is stirred for 1 to 2 hours with 10% sodium carbonate solution. Undissolved particles are filtered off and the pH of the filtrate is adjusted to 5 with hydrochloric acid. The 4-sulfanilamido-2,6-dimethoxy-5-chloropyrimidine which precipitates is recrystallized from isopropanol and then melts at 202–203°.

*Example 4*

3.86 g. of 4-($N^4$-acetylsulfanilamido)-2,6-dimethoxy-5-chloropyrimidine obtained according to Example 2 are boiled one hour in a mixture of 30 ml. of methanol and 5 ml. of concentrated hydrochloric acid. The reaction mixture is then concentrated in vacuum. 2 N-sodium carbonate solution is added to the residue until the pH is between 4 and 5. The precipitate is filtered off and recrystallized from isopropanol. 4 - sulfanilamido - 2,6 - dimethoxy-5-chloropyrimidine is obtained which melts at 202–203°.

*Example 5*

2.55 g. of 4-(4'-nitro-benzenesulfonamido)-2,6-dimethoxy-5-chloro-pyrimidine obtained according to Example 2 are hydrogenated in 100 ml. of methanol at room temperature and atmospheric pressure, using 1 g. of Raney nickel as catalyst. The catalyst is filtered off and the filtrate is concentrated in vacuum. The residue is dissolved in 30 ml. of 2 N-hydrochloric acid. After a short time the crystalline hydrochloride of 4-sulfanilamido-2,6-dimethoxy-5-chloro-pyrimidine precipitates. It melts with decomposition at 194–195°, after recrystallization from methanol/isopropanol. The hydrochloride is dissolved in a 2 N-sodium carbonate solution and the free base is precipitated with acetic acid at pH 5. After recrystallization from isopropanol the pure 4-sulfanilamido-2,6-dimethoxy-5-chloro-pyrimidine is obtained (this product is identical with that of Example 4).

*Example 6*

(a) 9.91 g. of 4-amino-2,5,6-trichloro-pyrimidine are refluxed for 14 hours together with a solution of 4.6 g. of sodium in 150 ml. of absolute methanol. The solvent is distilled off, the residue is taken up in water and the pH of the solution is adjusted to 6 with acetic acid. The residue is filtered off under suction, is dissolved in methylene chloride and dried with sodium sulfate. The pure 4-amino-2,6-dimethoxy-5 - chloro - pyrimidine is obtained after recrystallisation from hexane/methylene chloride 1:1 and melts at 163–165°.

(b) 2.4 g. of $N^4$-acetyl-sulfanilyl chloride are added in small portions to a mixture of 1.90 g. of 4-amino-2,6-dimethoxy-5-chloro-pyrimidine in 5 ml. of pyridine while stirring and cooling with ice. After standing at room temperature for three days, the suspension is concentrated in vacuum and the residue mixed well with 15 ml. of aqueous 2 N-sodium hydroxide solution. After filtration the filtrate is heated on the steam bath for 2 hours. The solution obtained is adjusted to pH 5 with dilute hydrochloric acid 1:1. The product is identical with 4-sulfanilamido-2,6-dimethoxy-5 - chloro - pyrimidine. (Compare Example 4).

*Example 7*

(a) 2.3 g. of 4-methylthio-2,5,6 - trichloro - pyrimidine are added to a solution of 0.57 g. of sodium in 20 ml. of methanol. The mixture is refluxed for 3 hours. The solvent is distilled off and the residue is mixed well with 20 ml. of water.

The residue is filtered off under suction and on drying it is recrystallized from hexane. The 4-methylthio-2,6-dimethoxy-5-chloro-pyrimidine melts at 92–94°.

(b) 1.5 g. of the thio-ether mentioned above is added in small portions to 11.5 ml. of ice cold 13% peracetic acid. 10 minutes later the solution is heated for 3 minutes at 80°, whereupon the solvent is distilled off to dryness in vacuum. The residue is mixed with 10 ml. of water, filtered off under suction, dried and recrystallized from benzene. The 4-methylsulfonyl-2,6-dimethoxy-5-chloro-pyrimidine obtained melts at 180–182°.

(c) 1.35 g. of the sulfone mentioned above is dissolved in 12 ml. of dimethyl formamide. 2.08 g. of sulfanilamide sodium are added. The mixture is stirred at room temperature for 1 hour, at 40° for 2 hours and for 15 hours at a bath temperature of 80°. The solution is concentrated in vacuum and the residue is taken up in water. The pH of the solution is adjusted to 8 with carbon dioxide. The solution is cooled for 2 hours with ice and the precipitated sulfanilamide is filtered with suction. The filtrate is acidified to pH 4 to 5 with dilute aqueous hydrochloric acid 1:1, cooled and the residue is filtered off by suction. After recrystallisation from methanol the 4-sulfanilamido-2,6-dimethoxy-5-chloro-pyrimidine melts at 202–203°. (Compare Example 4.)

*Example 8*

(a) 5.0 g. of 5-chloro-4,6-dihydroxy-2-methoxy-pyrimidine are added in small portions to a solution of 7 ml. of dimethyl aniline and 14 ml. of phosphorus oxychloride. The mixture is heated at a bath temperature of 105° for 1 hour and at 125° for another 90 minutes with continuous stirring. The remaining phosphorus oxychloride is distilled off in vacuum. The residue is poured onto ice, is extracted 3 times with ether and the ether extract is washed with water and dried with sodium sulfate. The ether is distilled off and the 2-methoxy-4,5,6-trichloro-pyrimidine is recrystallized from hexane; it melts at 74–76°.

(b) 11.0 g. of the trichloro-derivative mentioned above are dissolved in 100 ml. of dimethyl formamide, 20.0 g. of sulfanilamide sodium are added and the mixture is stirred for 15 hours at a bath temperature of 50°. The solvent is distilled off under high vacuum, the residue is dissolved in 100 ml. of water and the solution is adjusted to pH 7 to 8 with solid carbon dioxide. The precipitated sulfanilamide is filtered off by suction and the filtrate is adjusted to pH 4 with dilute aqueous hydrochloric acid 1:1. Thereby 4-sulfanilamido-2-methoxy-5,6-dichloropyrimidine precipitates; it melts on recrystallization from dimethyl formamide at 182–183° with gas development.

To produce dosage units for peroral application, the active substance of Formula I or a pharmaceutically acceptable salt thereof is combined with a pharmaceutically acceptable adjuvant compatible therewith, e.g. with solid, pulverulent carriers such as lactose, saccharose, sorbitol, mannite; starches such as potato starch, corn starch or amylopectin, also laminaria powder or citrus pulp powder; cellulose derivatives or gelatine, also lubricants such as magnesium or calcium stearate or polyethylene glycols (Carbowaxes) of suitable weights may be added, to form tablets or dragée centres. The latter are coated, for example, with concentrated sugar solutions which, e.g. can contain gum arabic, talcum and/or titanium dioxide, or they are coated with a lacquer dissolved in easily volatile organic solvents or mixtures of organic solvents. Dyestuffs can be added to these coatings, for example, to distinguish between different contents of active substance. Soft gelatine capsules (pearl-shaped closed capsules) and other closed capsules consist, for example, of a mixture of gelatine and glycerine and contain, e.g. mixtures of the active substance or a suitable salt thereof with Carbowax, and hard gelatine capsules contain, for example, granulates of the active substance or a suitable salt thereof with solid, pulverulent carriers such as, e.g. lactose, saccharose, sorbitol, mannite; starches such as potato starch, corn starch or amylopectin, cellulose derivatives or gelatine, as well as magnesium stearate or stearic acid. Suppositories are employed as dosage units for rectal application. These consist of a combination of the active substance or a suitable salt thereof with a neutral fatty base, or also gelatine rectal capsules can be employed which consist of a combination of the active substance or a suitable salt thereof with polyethylene glycols (Carbowaxes) of suitable molecular weight.

Ampoules for parenteral application preferably contain a water soluble salt of the active substance of Formula I and, possibly buffer substances in aqueous solution.

The content of the active substance according to the invention in the compositions according to the invention is preferably between about 50 mg. and about 600 mg. per tablet, or capsule or suppository or ampoule. This amount of active substance may constitute a major or a minor portion of the composition.

The following non-limitative examples illustrate the production of typical forms of application for oral use and parenteral use.

*Example 9*

Tablets containing 500 mg. of active substance of Formula I ($R_3=R_4=OCH_3$).

To produce 100,000 tablets each containing 500 mg. of 4-sulfanilamido-2,6-dimethoxy-5-chloropyrimidine, the following substances are used:

|  | kg. |
|---|---|
| A. 5-chlor-2,4-dimethoxy - 6 - sulfanilamido-pyrimidine | 50.000 |
| Potato starch, dried | 2.000 |
| B. Stearic acid pure | 1.200 |
| Ethanol pure ca. 4 liter. |  |
| C. Gelatine | 1.200 |
| Water, distilled ca. 16 liter. |  |
| D. Potato starch, dried | 4.000 |
| Talcum | 1.200 |
| Sodium carboxy methyl cellulose | 0.400 |
|  | 60.000 |

The mixture A is moistened with the stearic acid solution B and mixed for 5 minutes. The gelatine solution C is then added to the mass and mixed for about 10 minutes. As soon as the mass is moistened evenly, it is granulated through a sieve (25 mesh/1 cm.²) and then dried. The dried granulate is again sieved (60 mesh/1 cm.²) and subsequently mixed with the substances listed under D. After 1 hour of mixing, the mass so obtained is then pressed into tablets, each weighing 600 mg. and each containing 500 mg. of the active substance.

*Example 10*

200 5 ml. ampoules containing 10% of 4-sulfanilamido-2,6-dimethoxy-5-chloropyrimidine are produced by mixing:

| A. 4 - sulfanilamido - 2,6 - dimethoxy - 5-chloropyrimidine | 100.0 g. |
|---|---|
| B. Diethanolamine diluted with distilled water until 50% | 100.0 ml. |
| C. Distilled water | ad 1000.0 ml. |

500 ml. distilled water and the diethanolamine solution B are mixed. The active substance A is added and the suspension stirred until a clear solution results. Water is then added to make a total volume of 1000.0 ml. and the solution is filtered through a Büchner funnel (Schott & Gen. Jena G3). The filtrate is filled in 200 5 ml. ampoules. The sealed ampoules are sterilized in an autoclave at 120° for 20 minutes.

What is claimed is:
1. 4-sulfanilamido-2,6-dimethoxy-5-chloropyrimidine.
2. An antibacterial composition consisting essentially of a major amount of a compound of the formula

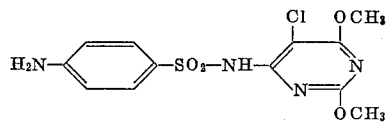

the balance consisting of pharmaceutically acceptable adjuvant compatible therewith.

3. An antibacterial composition consisting essentially of a minor amount of a compound of the formula

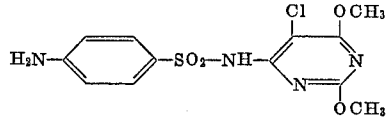

the balance consisting of pharmaceutically acceptable adjuvant compatible therewith.

References Cited by the Examiner

UNITED STATES PATENTS 2,407,966  9/1946  Sprague _____ 260—239.75

FOREIGN PATENTS 866,842  5/1961  Great Britain.
866,843  5/1961  Great Britain.

OTHER REFERENCES

Bretschneider et al.: Monatsh. Chem. vol. 92 No. 1 pp. 75–78 (1961).

Budesinsky et al.: Experientia vol. 17, No. 3 pp. 129–130 (1961).

Horstmann et al.: Arzn. Forsch., vol. 11, pages 682–4, (1961).

Spinks: Brit. Journal of Pharmacol., vol. 2, pp. 271–8, (1947).

WALTER A. MODANCE, *Primary Examiner.*

DUVAL T. McCUTCHEN, *Examiner.*